Patented Sept. 15, 1931

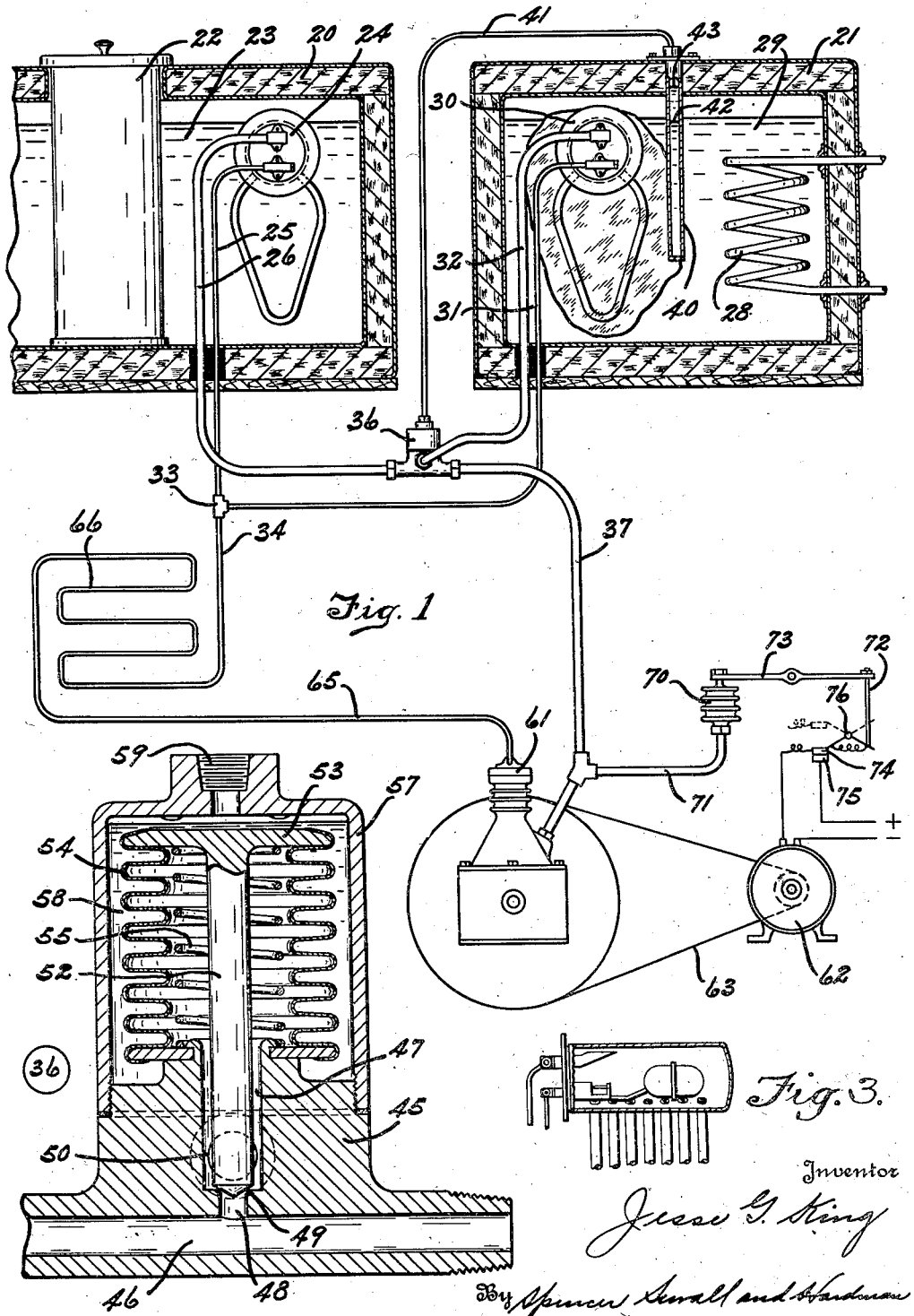

1,823,106

UNITED STATES PATENT OFFICE

JESSE G. KING, OF DAYTON, OHIO, ASSIGNOR, BY MESNE ASSIGNMENTS, TO FRIGIDAIRE CORPORATION, A CORPORATION OF DELAWARE

REFRIGERATING APPARATUS

Application filed April 29, 1925. Serial No. 26,642.

The present invention relates to refrigerating systems and one of the objects of the invention is to maintain a compartment to be cooled at substantially constant temperature.

One manner of carrying out the above object is to provide for the extraction of heat from a compartment containing a liquid, and, impeding the extraction of the heat when the liquid has been cooled to the temperature at which it solidifies.

The present invention is particularly applicable to refrigerating systems for soda fountain purposes in which it is desirable to cool drinking water, carbonated water, etc., to a temperature slightly above the freezing point thereof and maintain same at substantially an even temperature.

Further objects and advantages of the present invention will be apparent from the following description, references being had to the accompanying drawings wherein a preferred form of the present invention is clearly shown.

In the drawings:

Fig. 1 is a diagrammatic view of the improved refrigerating system, and

Fig. 2 is a longitudinal sectional view of a control valve for the system.

Fig. 3 is a vertical longitudinal cross-sectional view through either of the evaporators 24 or 30.

Referring to the drawings, for the purpose of illustration a cabinet 20 is shown for maintaining ice cream or the like in a frozen state and a cabinet 21 for cooling drinking water, carbonated water, or the like. For the sake of clearness, these cabinets 20 and 21 will be considered as ice cream cabinets and water cooling cabinets. The ice cream cabinet 20 is adapted to receive a quantity of ice cream cans, one of which is shown in 22, which are immersed in brine 23 within the cabinet. The brine is cooled by a cooling unit 24 connected respectively with a high pressure inlet tube 25 and a low pressure outlet tube 26. The cabinet 21 receives a plurality of coils for drinking water, carbonated water and the like, one of said coils being shown at 28. These coils are immersed in water 29 within the cabinet. The water is cooled by a cooling unit 30 which is connected respectively with a high pressure inlet tube or branch 31 and a low pressure outlet tube or collecting branch 32.

High pressure tubes or branches 25 and 31 leading respectively to the units 24 and 30 are connected by coupling 33 with a high pressure tube or distributing line 34. Low pressure tubes or branches 26 and 32 leading respectively from units 24 and 30 are connected with a valve 36 which in turn is connected with a low pressure refrigerant collecting line or tube 37. The pressures in the tubes or branches 25, 26, 31 and 32 are maintained because the units 24 and 30 are of the automatically flooded low pressure evaporator type, for instance, of the float controlled refrigerant inlet variety, as will be readily apparent from the illustration to those skilled in the art and by reference to the applications hereinafter referred to. The entire refrigerant contents within this type of evaporator are at a substantially uniform low pressure, the slight hydrostatic head excepted.

A vertically extending container 40 extends into the water 29 within the cabinet 21 and is disposed a slight distance from the unit 30. The container 40 is connected by a relatively small tube 41 with the valve 36. Container 40 contains water to substantially the level shown at 42 and oil to the level 43.

Valve 36 comprises a body 45 having a passage 46 connected with the tube 26 and the tube 37. Body 45 is also provided with a transversely extending passage 47 having a reduced portion 48 communicating with the passage 46 and providing a seat 49. Passage 47 is in communication with passage 50 which is connected with the tube 32. Passage 47 receives a valve 52 adapted to rest upon the seat 49 to control the passage of fluid between the passage 47 and the passage 46. The upper end of the valve 52 terminates in an end member 53 to which a metal bellows 54 is suitably sealed. The other end of the bellows 54 is suitably sealed to the upper portion of body 45. In this manner the fluid within the passage 47 and bellows 54 is sealed. A spring 55 is located within the bellows 54 and normally tends to raise the head portion 53 whereby the valve is removed from its seat 49. A cover 57 surrounds the bellows 54 and provides a chamber 58 which contains a quantity of oil. The tube 41 leading from the container 40 is connected at 59.

The refrigerating system also includes a compressor 61 which is driven by a motor 62 through a belt 63. The refrigerant is delivered to the compressor through the pipe 37 and compressed thereby and forced through a tube 65 into a condenser 66. The condensed refrigerant flows by way of tube 34 to the tubes 25 and 31 whence it is carried to the cooling units 24 and 30. The vaporized refrigerant is withdrawn from the cooling unit 24 through pipe 26, passage 46 of valve 36 to the tube 37, and, the vaporized refrigerant is withdrawn from the unit 30 through the pipes 32, passages 50, 48, and 46 of valve 36, to the tube 37. When the compressor is in operation, the cooling unit 30 will be reduced in temperature below the freezing point of water, whereby ice will form on said unit. The formation of ice around the unit will continue until a portion of the container 40 is engaged by the ice, at which time the water within the container 40 will freeze and thereby expand. This expansion will force the oil within the container upwardly to compress the air in the container and in the pipe 41 thereby causing a pressure to be exerted upon the oil within the chamber 58 of valve 36. Pressure within the chamber 58 will cause the metal bellows 54 to collapse to restrict or shut off the flow of refrigerant from the passage 47 to the passage 46 and thereby impede the circulation of refrigerant medium within the cooling unit 30 which in turn will impede the cooling of said compartment 21. The oil in the container 40 and chamber 58 provides a noncompressible medium whereby the pressure within the chamber will be increased to a relatively high degree by the expansion within the container.

The refrigerating motor 62 is automatically started and stopped in accordance with the pressure on the low pressure side of the refrigerating system. The motor control herein disclosed involves the fact that the passage of liquid refrigerant from the conduit 34 to the expansion chambers 24 and 30 may be controlled by the float valves within the chambers 24 and 30 or by any other liquid level control valves recognized in this art. A low pressure or vapor conduit 37 leads from the upper portion of the expansion chambers 24 and 30 to the low pressure side of the piston 60 of the compressor through the pipe connection shown as tapped into the crank case of the compressor. For the purpose of illustration in the present invention there is shown a metal bellows 70 connected by a pipe 71 with the pipe 37 on the low pressure side of the refrigerating system. Bellows 70 operates a rod 72 through a lever 73. Rod 72 actuates a contact 74 for engaging and disengaging a contact 75 through a snap switch 76. The motor control mechanism is adjusted so as to render the motor inoperative when the temperature within the cooling unit 24 reaches a predetermined low value, at which temperature the pressure within the low pressure side of the refrigerating system attains a predetermined low value.

When the pressure within the low pressure side attains a predetermined high value the controller operates to start the motor. Since the temperature of the cooling unit 30 is never reduced to as low a value as the temperature within the cooling unit 24, the motor is rendered inoperative generally only by the temperature within the cooling unit 24. At this time a relatively large quantity of ice is formed around the unit 30 and the temperature of the water 29 in the compartment 21 is substantially at freezing. This relatively large quantity of ice is ordinarily not melted between the time that the compressor is stopped and started, therefore this ice will maintain the temperature within the compartment 21 at substantially water freezing temperature. However should the temperatures controlling the evaporator 30 exceed the upper limit, the valve 52 would open sufficiently to cause the motor 62 to start. Thus conditions in the collecting line 37 are dependent on conditions in either evaporator.

The container 40 and the coils 28 are so located with respect to the cooling unit 30, that the water within the container 40 will freeze before the substance within the coils 28. Therefore, it will be apparent that the substance within the coils 28 cannot freeze because, as soon as the water within the container 40 freezes, the valve 36 will actuate to impede the flow of refrigerant from the unit 30.

While the form of embodiment of the present invention as herein disclosed, constitutes a preferred form, it is to be understood that other forms might be adopted, all coming within the scope of the claims which follow.

What is claimed is as follows:

1. A refrigerating system, comprising in combination, a cooling compartment containing a quantity of liquid, means for cooling said compartment for freezing said liquid, and means responsive to the solidification of the liquid within the compartment for controlling the temperature of said cooling means.

2. A refrigerating system, comprising in combination, a cooling compartment containing a quantity of liquid, means for cooling said compartment for freezing said liquid, said means being so disposed that one portion of said compartment will be colder than a second portion whereby the liquid will solidify in the said first portion before solidifying in the second portion, and means spaced from said cooling means and responsive to the solidification of a certain quantity of said liquid for controlling the temperature of said cooling means.

3. A refrigerating system, comprising in combination, a cooling compartment containing a quantity of liquid, means for causing the circulation of a cooling medium to cool said compartment for freezing said liquid, and means responsive to the solidification of the said liquid within the compartment for controlling the back pressure upon said cooling medium, whereby the temperature of said cooling medium is controlled.

4. A refrigerating system, comprising in combination, a cooling compartment containing a quantity of liquid, means for causing the circulation of cooling medium to cool said compartment for freezing said liquid, said means including a conduit, a valve controlling the flow of cooling medium in the conduit, said valve being normally in an unrestricted position, and means responsive to the solidification of the liquid within the cooling compartment for actuating said valve to impede the flow of cooling medium in the conduit.

5. A refrigerating system, comprising in combination, a cooling compartment containing a quantity of liquid, means for causing the circulation of cooling medium to cool said compartment for freezing said liquid, said means including a conduit, a pressure operated valve controlling the flow of cooling medium in the conduit, said valve being normally in an unrestricted position, and pressure operated means connected with said valve and responsive to the solidification of liquid within the cooling compartment for actuating said valve to impede the flow of cooling medium in the conduit.

6. A refrigerating system, comprising in combination, a cooling compartment containing a quantity of liquid, means for causing the circulation of cooling medium to cool said compartment for freezing said liquid, and means for controlling said circulation, said control means including a container containing a quantity of liquid having the same freezing point as and subjected to the temperature of the liquid within said compartment, whereby said control means is responsive to the solidification of liquid within the compartment for controlling the circulation of cooling medium.

7. A refrigerating system, comprising in combination, a cooling compartment containing a quantity of liquid, means for causing the circulation of cooling medium to cool said compartment for freezing said liquid, said means including a conduit, a pressure operated valve controlling the flow of cooling medium in the conduit, said valve being normally in an unrestricted position, and a container within the compartment and connected with the valve whereby the valve is responsive to the pressure within the container, said container containing a liquid having substantially the same freezing point as the liquid within the cooling compartment, said valve being actuated to impede the circulation of cooling medium within the conduit when the pressure increases within the container due to expansion of the liquid in the container by freezing.

8. A refrigerating system, comprising in combination, a cooling compartment containing a quantity of liquid, means for causing the circulation of cooling medium to cool said compartment for freezing said liquid, said means including a conduit, a pressure operated valve controlling the flow of cooling medium in the conduit, said valve being normally in an unrestricted position, and a container within the compartment and connected with the valve whereby the valve is responsive to the pressure within the container, said container containing a fluid having such characteristic so as to change the pressure within the container a substantial degree when solidification of the liquid takes place within the compartment and thereby actuate said valve and impede the circulating of cooling medium in the conduit.

9. A refrigerating system, comprising in combination, a cooling compartment containing a quantity of liquid, a cooling unit adapted to cool said compartment for solidifying said liquid, means for withdrawing refrigerant medium from said unit and for condensing said medium and forcing same into the unit, and means responsive to the solidification of the liquid within the compartment for controlling the pressure upon the refrigerant medium in said cooling unit.

10. A refrigerating system, comprising in combination, a plurality of cooling compartments, one of said compartments being a liquid containing compartment, a cooling unit for each compartment, means common to both units for withdrawing refrigerant medium therefrom and condensing the medium and forcing same into said units and means responsive to the solidification of the liquid within said liquid containing compartment for controlling the pressure upon the refrigerant medium in the cooling unit in said liquid containing compartment.

11. A refrigerating system, comprising in combination, two cooling compartments each having a cooling unit therein, one of said compartments containing a quantity of liquid, common means for causing the circulation of refrigerant medium in each of said cooling units, said means including a conduit having branches connected with both of said cooling units, a valve controlling the flow of medium in the branch connected with the cooling unit in the liquid containing compartment, and means responsive to the solidification of the liquid in said compartment for controlling the valve to impede the flow of medium in the cooling unit of said compartment relative to the flow in the cooling unit of the other compartment.

In testimony whereof I hereto affix my signature.

JESSE G. KING.